(12) United States Patent
Zhang et al.

(10) Patent No.: US 9,762,882 B2
(45) Date of Patent: Sep. 12, 2017

(54) METHOD AND APPARATUS FOR EFFICIENT CODING OF DEPTH LOOKUP TABLE

(71) Applicant: HFI INNOVATION INC., Zhubei, Hsinchu County (TW)

(72) Inventors: Kai Zhang, Beijing (CN); Jicheng An, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 239 days.

(21) Appl. No.: 14/655,436

(22) PCT Filed: Jan. 10, 2014

(86) PCT No.: PCT/CN2014/070428
§ 371 (c)(1),
(2) Date: Jun. 25, 2015

(87) PCT Pub. No.: WO2014/108088
PCT Pub. Date: Jul. 17, 2014

(65) Prior Publication Data
US 2015/0350623 A1    Dec. 3, 2015

(30) Foreign Application Priority Data

Jan. 11, 2013  (WO) ................ PCT/CN2013/070377
Jun. 26, 2013  (WO) ................ PCT/CN2013/077983
Aug. 14, 2013  (WO) ................ PCT/CN2013/081455

(51) Int. Cl.
*H04N 13/00* (2006.01)
*H04N 19/48* (2014.01)
(Continued)

(52) U.S. Cl.
CPC ..... *H04N 13/0018* (2013.01); *H04N 13/0022* (2013.01); *H04N 19/14* (2014.11);
(Continued)

(58) Field of Classification Search
CPC .... H04N 19/597; H04N 19/463; H04N 19/14; H04N 13/0022; H04N 13/0018; H04N 19/48; H04N 13/0048
(Continued)

(56) References Cited

U.S. PATENT DOCUMENTS 8,620,099 B2    12/2013  Sim
2009/0110073 A1* 4/2009  Wu .......................... H04N 7/50
                                                    375/240.15
(Continued)

FOREIGN PATENT DOCUMENTS

CN          101465004 A       6/2009
WO       WO 2014/139566       9/2014

OTHER PUBLICATIONS

Tech, G., et al.; "3D-HEVC Test Model 2;" Joint Collaborative Team on 3D Video Coding Extension Development of ITU-T SG 16 WP 3 and ISO/IEC JTC 1/SC 29/WG 11; Oct. 2012; pp. 1-118.
(Continued)

*Primary Examiner* — Zhihan Zhou
(74) *Attorney, Agent, or Firm* — McClure, Qualey & Rodack, LLP (57) ABSTRACT

A method and apparatus for encoding and decoding depth lookup table (DLT) using a constrained table value range are disclosed. For a decoder, a constrained table value range from a minimum table value to a maximum table value of the DLT is decoded from the coded DLT information. Bit map values for depth values in a depth range from (the minimum table value+1) to (the maximum table value−1) are then decoded. The bit map values indicate whether the depth values are in the DLT respectively. The DLT for the current depth map can be reconstructed based on the constrained table value range and the bit map values for the depth values in the depth range. For an encoder, a constrained table value range from a minimum table value to a
(Continued)

maximum table value of the DLT is determined and encoded the DLT into coded DLT information.

27 Claims, 5 Drawing Sheets

(51) Int. Cl.
    *H04N 19/597* (2014.01)
    *H04N 19/463* (2014.01)
    *H04N 19/14* (2014.01)
(52) U.S. Cl.
    CPC ........... *H04N 19/463* (2014.11); *H04N 19/48* (2014.11); *H04N 19/597* (2014.11); *H04N 13/0048* (2013.01)
(58) Field of Classification Search
    USPC .................................................. 375/240.12
    See application file for complete search history.

(56) References Cited

U.S. PATENT DOCUMENTS

| | | | | |
|---|---|---|---|---|
| 2009/0161989 A1* | 6/2009 | Sim | ...................... | H04N 13/026 382/285 |
| 2010/0166326 A1* | 7/2010 | Jeong | ...................... | G06T 7/194 382/233 |

OTHER PUBLICATIONS

Bourke, P.; "A Beginners Guide to Bitmaps;" http://paulbourke.net/dataformats/bitmaps/; Nov. 1993; pp. 1-8.

Fabian Jager: "3D-CE6.h: Simplified Depth Coding with an optional Depth Lookup Table"; Joint Collaborative Team on 3D Video Coding Extension Development of ITU-T SG 16 WP 3 and ISO/IEC JTC 1/SC 29/WG 11; Document: JCT3V-B0036; 2nd Meeting: Shanghai, CN, Oct. 13-19, 2012; pp. 1-16.

Zhang, et al.: "3D-CE6.h related: An efficient coding method for DLT in 3DVC"; Joint Collaborative Team on 3D Video Coding Extension Development of ITU-T SG 16 WP 3 and ISO/IEC JTC 1/SC 29/WG 11; Document: JCT3V-00142; 3rd Meeting: Geneva, CH, Jan. 17-23, 2013; pp. 1-5.

Fabian Jager: "CE6.H related: Results on Updating Mechanism for Coding of Depth Lookup Table (Delta-DLT)"; Joint Collaborative Team on 3D Video Coding Extensions of ITU-T SG 16 WP 3 and ISO/IEC JTC 1/SC 29/WG 11; Document: JCT3V-D0054; 4th Meeting: Incheon, KR, Apr. 20-26, 2013; pp. 1-13.

Zhang, et al.: "3D-CE6.h results on an efficient coding method for DLT in 3DVC"; Joint Collaborative Team on 3D Video Coding Extension Development of ITU-T SG 16 WP 3 and ISO/IEC JTC 1/SC 29/WG 11; Document: JCT3V-D0151; 4th Meeting: Incheon, KR, Apr. 20-26, 2013; pp. 1-4.

Zhang, et al.: "AHG7: An efficient coding method for DLT in 3D-HEVC"; Joint Collaborative Team on 3D Video Coding Extension Development of ITU-T SG 16 WP 3 and ISO/IEC JTC 1/SC 29/WG 11; Document: JCT3V-E0176; 5th Meeting: Vienna, AT, Jul. 27-Aug. 2, 2013; pp. 1-5.

International Search Report dated Apr. 21, 2014, issued in PCT/CN2014/070428.

* cited by examiner

METHOD AND APPARATUS FOR EFFICIENT CODING OF DEPTH LOOKUP TABLE

CROSS REFERENCE TO RELATED APPLICATIONS

The present application is a national stage application of PCT patent application PCT/CN2014/070428, filed Jan. 10, 2014, entitled "Method and Apparatus for Efficient Coding of Depth Lookup Table." The present application also claims priority to the following PCT applications: PCT/CN2013/070377, filed on Jan. 11, 2013, entitled "An Efficient Coding Method for DLT in 3DVC", PCT/CN2013/077983, filed on Jun. 26, 2013, entitled "An Efficient Coding Method for DLT in 3DVC", PCT/CN2013/081455, filed on Aug. 14, 2013, entitled "An Efficient Differential Coding Method for DLT in 3DVC". The PCT Patent Applications are hereby incorporated by reference in their entireties.

FIELD OF INVENTION

The present invention relates to three-dimensional video coding. In particular, the present invention relates to coding the depth lookup table in three-dimensional and multi-view video coding.

BACKGROUND OF THE INVENTION

Three-dimensional (3D) television has been a technology trend in recent years that intends to bring viewers sensational viewing experience. Various technologies have been developed to enable 3D viewing. Among them, the multi-view video is a key technology for 3D TV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

In 3D video coding, depth information associated with the underlying texture images is useful for improving the coding efficiency as well as for rendering of synthesized views. The statistical distribution of depth data for typical scenes is usually sparse. Some depth values may not occur in depth maps. Accordingly, Simplified Depth Coding (SDC) and Depth Lookup Table (DLT) have been adopted in the HEVC-based Test Model (HTM), where HEVC refers to the emerging video coding standard—High Efficiency Video Coding. In the HTM, for each CU (coding unit), the prediction residual of depth data is usually transform coded. However, the HTM also supports a transform skip mode for the depth data to bypass the transform. When the SDC mode is selected, a set of four different prediction modes is available. After an optimal prediction mode is selected among the four modes, the residual is formed accordingly. In the SDC mode, the transform is not applied to the prediction residual either. Since the SDC prediction process always results in one or two depth segments per coded block, a single residual DC depth value is coded for each of these segments. Furthermore, a DLT is used to map coded depth values in SDC to valid depth values of the original depth map. At the encoder side, the DLT can be constructed based on an initial analysis of the input depth map. The DLT is then coded in the sequence parameter set (SPS).

Figure 1:
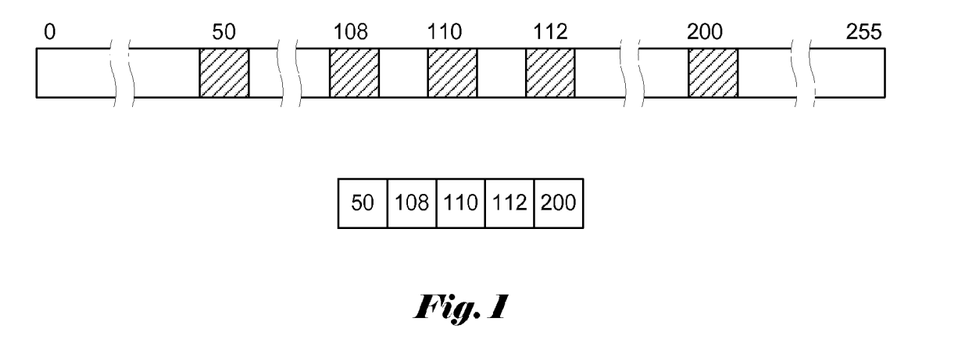
FIG. 1 illustrates an example of a depth lookup table (DLT) consisting of table values 50, 108, 110, 112 and 200.

The DLT is an optional coding tool for depth map coding. According to the current HTM, the encoder will not use the DLT coding tool if all depth values from 0 to the maximum depth value (e.g. 255) appear in the original depth map during the analysis step. Otherwise, the DLT will be coded in the sequence parameter set (SPS). FIG. 1 illustrates an example of DLT coding process. In order to code the DLT, the number of valid depth values (i.e., 5 in this example) is coded using Exp-Golomb code first. Then, each valid depth value (i.e., a depth value selected from 50, 108, 110, 112 and 200 in this example) is coded using Exp-Golomb code as well. Table 1 illustrates the syntax for DLT coding according to the HTM. Syntax element, dlt_flag[i] indicates whether the DLT coding tool is used for the depth sequence indicated by layer i. If the flag indicates that the DLT coding tool is used (i.e., dlt_flag[i]=1), syntax element num_depth_values_in_dlt[i] is used to indicate the number of table values in the DLT. The table values in the DLT are then included in the bitstream.

TABLE 1

| | |
|---|---|
| dlt_flag[ i ] | u(1) |
| if( dlt_flag[ i ] ) { | |
|    num_depth_values_in_dlt[ i ] | ue(v) |
|    for ( j = 0; j < num_depth_values_in_dlt ; j++) { | |
|       dlt_depth_value[ i ][ j ] | ue(v) |
|    } | |
| } | |

Exp-Golomb code is efficient when smaller values have higher probabilities of occurrence. However, that is not the case for valid depth values. As a result, Exp-Golomb codes may not be efficient for DLT coding. In the common test condition, four sequences, i.e., Balloons, Kendo, Newspapercc and PoznanHall are determined to use the DLT coding tool, while the other three are determined not to use the DLT coding tool. Statistics are collected based on the four sequences. As shown in Table 2, DLT requires 557.33 bits in average, which account for more than 65% bits of SPS for depth components. In other words, the DLT coding contributes a majority portion of bits in SPS for depth components. When the SPS carries the DLT, the SPS size becomes much larger than the SPS without the DLT.

TABLE 2

| | | DLT Size (bits) | SPS Size (bits) | D/S (%) |
|---|---|---|---|---|
| Balloons | V0_depth | 555 | 845 | 65.68% |
| | V1_depth | 641 | 937 | 68.41% |
| | V2_depth | 617 | 915 | 67.43% |
| Kendo | V0_depth | 485 | 775 | 62.58% |
| | V1_depth | 637 | 933 | 68.27% |
| | V2_depth | 649 | 947 | 68.53% |
| Newspapercc | V0_depth | 606 | 896 | 67.63% |
| | V1_depth | 621 | 917 | 67.72% |
| | V2_depth | 696 | 994 | 70.02% |
| PoznanHall2 | V0_depth | 420 | 712 | 58.99% |
| | V1_depth | 380 | 678 | 56.05% |
| | V2_depth | 381 | 681 | 55.95% |
| Average | | 557.33 | 852.50 | 65.38% |

Accordingly, it is desirable to develop a new DLT coding tool that will improve the coding efficiency of the DLT.

SUMMARY OF THE INVENTION

A method and apparatus for encoding and decoding depth lookup table (DLT) in a three-dimensional or multi-view video coding using a constrained table value range are disclosed. For a decoder, embodiments according to the present invention decode a constrained table value range from a minimum table value to a maximum table value of the DLT based on the coded DLT information. The minimum table value is greater than a minimum depth value of a full-range DLT, the maximum table value is smaller than a maximum depth value of the full-range DLT, or the minimum table value is greater than the minimum depth value and the maximum table value is smaller than the maximum depth value. Bit map values for depth values in a depth range from (the minimum table value+1) to (the maximum table value−1) are then decoded. The bit map values indicate whether the depth values are in the DLT respectively. The DLT for the current depth map can be reconstructed based on the constrained table value range and the bit map values for the depth values in the depth range. For an encoder, embodiments according to the present invention determine a constrained table value range from a minimum table value to a maximum table value of the DLT and encode the DLT into coded DLT information, wherein said encoding the DLT into the coded DLT information comprises encoding first information associated with the constrained table value range into the coded DLT information. A flag can be used to indicate whether to use the full-range DLT or a constrained DLT.

The constrained table value range may be represented by the minimum table value and a maximum table difference, wherein the maximum table difference corresponds to the difference between the maximum table value and the minimum table value, and the minimum table value and the maximum table difference can be coded using unsigned integers. The minimum table value and the maximum table value may use default values when the minimum table value and the maximum table difference are not coded. For example, the minimum table value may use −1 as a default value and the maximum table value may use MAX_DEPTH_VALUE+1 as the default value, wherein MAX_DEPTH_VALUE corresponds to the maximum depth value. The constrained table value range may also be represented by the minimum table value and the maximum table value, and the minimum table value and the maximum table value can be coded using unsigned integers.

Another aspect of the present invention addresses bit map coding. The bit map values for depth values in a depth range from (the minimum table value+1) to (the maximum table value−1) are also incorporated in the coded DLT information, where the bit map values indicate whether respective depth values are in the DLT or not. In one embodiment, the bit map values for the depth values in the depth range are coded using run-length coding on zero-runs or one-runs associated with the bit map values. In another embodiment, the bit map values for the depth values in the depth range are coded using differences between the zero-runs and a minimum zero-run or between the one-runs and a minimum one-run. The differences can be encoded into the coded DLT information using n-bit fixed length coding, where n is a positive integer. The excess part of the second difference can be coded using Exp-Golomb. An optimal value for n can be determined at the encoder side based on a lowest resulting bitrate for the coded DLT information. A flag can be coded to signal whether the run-length coding is used for coding bit map values or the bit map values are coded as a bit-map directly.

In yet another embodiment of the present invention, the bit map values for the depth values in the depth range are coded using inter-view coding when the current depth map is in a dependent view. The inter-view bit map values are formed by applying Exclusive-OR operations between the depth values in the depth range and second bit map values associated with a second DLT of a second depth map in a base view.

DETAILED DESCRIPTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

The present invention discloses a coding method that indicates the range of the DLT for efficient DLT coding. In one embodiment, a Range Constrained Bit Map (RCBM) coding method is disclosed. According to RCBM, the DLT is coded in two steps.

In the first step, the minimum table value (i.e., min_table_value) and the maximum table value difference (i.e., diff_max_value) are coded as unsigned integers to indicate the constrained value range of the DLT. The largest table value is designated as max_table_value, which can be determined according to max_table_value=min_table_value+diff_max_value.

In the second step, the bit map is coded, where a flag, bit_map_flag[i] is used to indicate whether an underlying depth value exists for the DLT to be coded. Since both max_table_value and min_table_value exist, there is no need of bit map for max_table_value and min_table_value. Accordingly the index i for bit_map_flag[i] is from 0 to (max_table_value−min_table_value−2). If bit_map_flag[i]=1, then depth value (i+min_table_value+1) of the DLT exists. If bit_map_flag [i]=0, depth value (i+min_table_value+1) of the DLT does not exists.

A flag, full_map_flag is used to signal whether to use a DLT with a constrained table value range, where the constrained table value range is identified by min_table_value and diff_max_value. When the range is not coded, default values can be used. For example, min_table_value can use a default value of −1, max_table_value can use a default value of (MAX_DEPTH_VALUE+1). A full bit map without range constrained is coded in this case. The full bit map requires (MAX_DEPTH_VALUE+1) bits. The encoder can decide whether to code the DLT table according to the RCBM depending on whether RCBM results in fewer bits. According to this embodiment, the maximum number of bits required to code the DLT is MAX_DEPTH_VALUE+2 (e.g. 257 for 8-bit samples).

Figure 2:
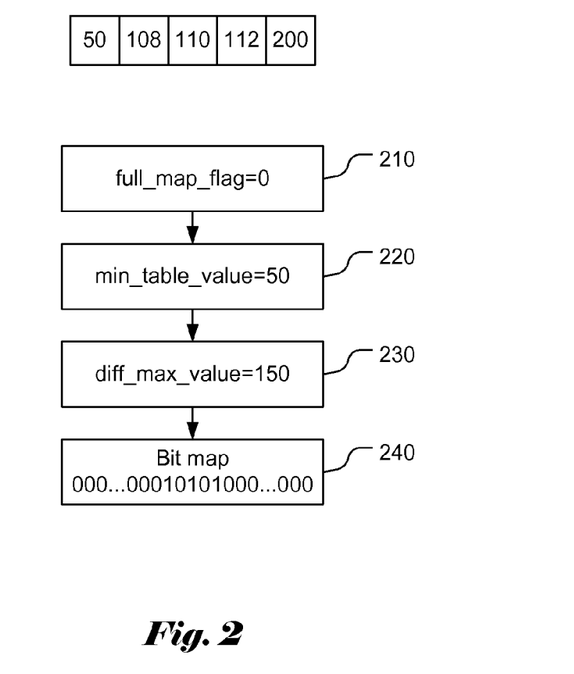
FIG. 2 illustrates an example of depth lookup table (DLT) coding according to an embodiment of the present invention, where a full map flag, the minimum table value, the maximum table value and the bit map for table values between the minimum table value and the maximum table value are coded.

FIG. 2 illustrates exemplary coding process based on the RCBM for the DLT in FIG. 1. In FIG. 2, full_map_flag=0 indicates that the full map is not used as shown in step 210. The minimum table value, i.e., min_table_value=50 is coded in step 220. The table range, i.e., diff_max_value=150 is coded in step 230. The bit map values, i.e., bit_map_flag[i] for i=0, . . . , 148 (i.e., 149 bits) are coded as shown in step 240.

Exemplary syntax to support the RCBM is shown in Table 3. Syntax element, code_full_bit_map_[i] is a flag used to indicate whether a full map is used or not. When the full bit map is not used, the minimum table value (i.e., min_dlt_value[i]) and the range value (i.e., diff_max_dlt_value[i]) are incorporated in the syntax. If the full map is used, the default min_dlt_value[i] and diff_max_dlt_value[i] (i.e., −1 and MAX_DEPTH_VALUE+1) will be used respectively. The bit map, i.e., bit_map_flag[i][j] is then coded.

TABLE 3

| | |
|---|---|
| code_full_bit_map_flag[i] | u(1) |
| if(!code_full_bit_map_flag[i]){ | |
|    min_dlt_value[i] | u(v) |
|    diff_max_dlt_value[i] | u(v) |
| } | |
| for(j=0;j< max_dlt_value[i] − min_dlt_value[i] − 1;j++) | |
|    bit_map_flag[i][j] | u(1) |

In another embodiment of the present invention, the DLT is coded using an enhanced range constrained bit-map (ERCBM) coding method. According to the ERCBM, the DLT is represented by a range constrained bit-map as mentioned above, where min_dlt_value and diff_max_dlt_value are coded as unsigned integers to constrain the table value to the range [MinDltValue, MaxDltValue] for the DLT. Values outside this range are not used in the DLT. Values in DLT between (MinDltValue, MaxDltValue) can be represented by a bit-map BM[i] with i from 0 to MaxDltValue−MinDltValue−2. If BM[i]=1, then value (i+MinDltValue+1) belongs to the DLT. Otherwise, value (i+MinDltValue+1) does not belong to DLT.

Figure 3:
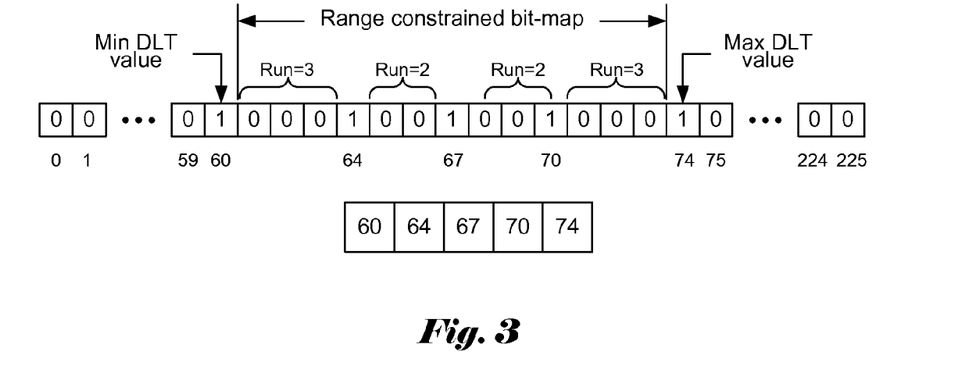
FIG. 3 illustrates an example of depth lookup table (DLT) coding according to an embodiment of the present invention, where the bit map is coded using run-length coding.

In some embodiments, differential run-length coding is applied to code the bit-map. The differential run-length coding is also referred to as run-length coding or differential coding in the following descriptions. The bit-map can also be represented by the lengths of zero-runs (i.e., the number of consecutive zeroes) or one-runs (i.e., the number of consecutive ones). Run-length coding is efficient for underlying data having high probabilities of repeating symbols (i.e., 0 in this case). For the bit map of the DLT with a small number of table values, run length coding on zero-runs will be more efficient. FIG. 3 illustrates exemplary differential run-length coding incorporating an embodiment of the present invention. The lengths of zero-run are 3, 2, 2 and 3 sequentially for the DLT in FIG. 3, wherein the first zero-run (i.e., 3) corresponds to three 0's between depth value 64 and depth value 60; the second zero-run corresponds to the two 0's between depth value 67 and depth value 64; the third zero-run corresponds to the two 0's between depth value 70 and depth value 67; and the fourth zero-run corresponds to the three 0's between depth value 74 and depth value 70. The zero-runs correspond to 3, 2, 2 and 3 respectively are coded along with the minimum table value and the range value (i.e. the difference between the maximum table value and the minimum table value). The zero-runs can be coded by fixed-length coding with n bits. If a difference exceeds $2^n-2$, the excess will be coded with Exp-Golomb code, where n is signaled before the differences are coded. The encoder can choose an optimal n that may result in the minimum number of bits.

In order to guarantee the number of bits for the worst case to be predictable and acceptable, the encoder can use the RCBM as a fall back mode. In the worst case, 0, 1, . . . 255 are included in the DLT. diff_value requires 8 bits, min_value requires 0 bit, run_length_coding_flag requires 1 bit, and the bit_map_flags requires 254 bits when RCBM is utilized. Accordingly, a DLT can be coded with 263 bits in the worst case for 8-bit depth data. An exemplary syntax design according to an embodiment of the present invention are illustrated in Table 4, where min_run_length corresponds to the minimum zero-run, run_length_bits_minus1 corresponds to (n−1) and run_length_diff[j] corresponds to the difference between a current zero-run and the minimum zero-run.

TABLE 4

| | |
|---|---|
| diff_value | u(v) |
| min_value | u(v) |
| run_length_coding_flag | u(1) |
| if(run_length_coding_flag){ | |
|    min_run_length | u(3) |
|    run_length_bits_minus1 | u(3) |
|    for(j = MinV+1; j< MaxV; j+=Run[j]+1){ | |
|       run_length_diff[j] | u(v) |
|       if(run_length_diff[j]==RunBoundary) | |
|          run_length_diff_rem[j] | ue(v) |
|    } | |
| } | |
| else{ | |
|    for(j = MinV +1; j< MaxV; j++) | |
|       bit_map_flag[j] | u(1) |
| } | |

Figure 4:
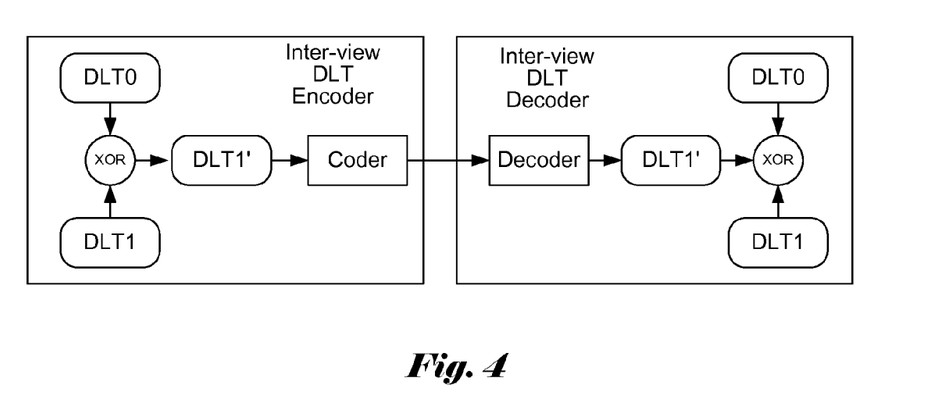
FIG. 4 illustrates an example of depth lookup table (DLT) coding according to an embodiment of the present invention, where the inter-view bit map is derived based on the bit map of the base view.

The differential run-length coding for the DLT as disclosed above can be combined with other DLT processing techniques. For example, the differential run-length coding can be used jointly with the delta-DLT method as disclosed in JCT3V-D0054 (Fabian Jäger, "CE6.H related: Results on Updating Mechanism for Coding of Depth Lookup Table (Delta-DLT)", Joint Collaborative Team on 3D Video Coding Extensions of ITU-T SG 16 WP 3 and ISO/IEC JTC 1/SC 29/WG 1, 4th Meeting: Incheon, KR, 20-26 Apr. 2013, Document: JCT3V-D0054). In JCT3V-D0054, the inter-view correlation is utilized to improve the coding efficiency. The delta-DLT process is illustrated in FIG. 4, where DLT0 and DLT1 correspond to the DLTs of the base view and the dependent view respectively. Both DLT0 and DLT1 are represented in the full bit-map form. DLT1' is calculated as DLT1'=DLT0⊕DLT1, where "⊕" represents the "Exclusive OR" operation. According to the delta-DLT method, the DLT1' is coded instead of DLT1. After DLT1' is decoded, DLT1 is reconstructed as DLT1=DLT0⊕DLT1'. Since DLT0 and DLT1 correspond to the bit maps in two views of a same scene, they should be very similar. Therefore, the Exclusive OR operation will result a lot of zeroes, which can be beneficial for length coding of zero-runs. Since the inter-view information (i.e., DLT0) is only utilized at the reconstruction step, the delta-DLT approach does not introduce any parsing dependency issue. Therefore, ERCBM can work well regardless DLTs are coded in VPS (video parameter set), SPS (sequence parameter set), PPS (picture parameter set) or slice headers.

A differential coding method is disclosed where min_dlt_value and diff_max_dlt_value are coded as unsigned integers to indicate the constrained table value range, [MinDltValue, MaxDitValue] of the DLT as before. Values outside this range are not used in the DLT. Differences between consecutive values in DLT can also be used to represent the DLT. Difference, i.e., Diff[i] is defined as (DLTValue[i+1]−DLTVlaue[i]−1). For example, if table values in the DLT are 60, 64, 67, 70 and 74, the corresponding differences are 3, 2, 2 and 3. The differences between consecutive values can also be interpreted as the zero-runs.

Figure 5:
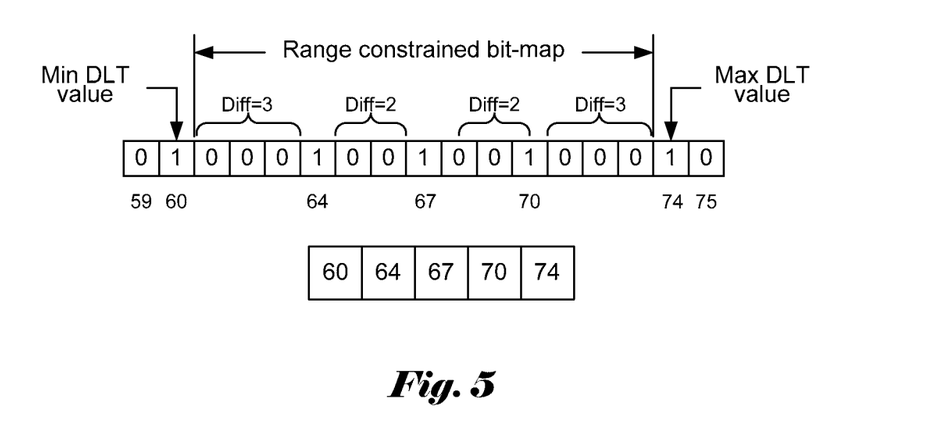
FIG. 5 illustrates an example of depth lookup table (DLT) coding according to an embodiment of the present invention, where the differences of consecutive table values are coded.

In order to further improve differential or run-length coding efficiency, the minimum difference (i.e. the minimum zero-run) is coded first and then deltas between respective differences (i.e. zero-runs) and the minimum difference are coded subsequently. FIG. 5 demonstrates an example of a DLT, where differences are 3, 2, 2 and 3. The minimum difference '2' is coded first, and then the deltas corresponding to the differences, i.e., 1, 0, 0 and 1 are coded in order. The deltas are coded by fixed-length coding with n bits. If a difference exceeds $2^n-2$, the excess will be coded with Exp-Golomb code. The number of bits for the fixed-length coding, i.e., n is signaled before deltas are coded. Since n is always greater then 0, n−1 instead of n is coded. The encoder can choose the optimal n that results in the minimum number of bits for the DLT.

The coding process using the delta of the difference between an underlying value and the minimum value in the DLT can be described based on FIG. 5. At the encoder side, the encoding process is as follows:
  a. The difference between the minimum value '60' and maximum value '74' is '14'. Therefore, diff_max_dlt_value=14 is coded first.
  b. min_dlt_value=60 is then coded.
  c. min_diff=2 is coded.
  d. Deltas associated with the table values in the DLT correspond to 1, 0, 0 and 1. If n=1, the required bits for the deltas are 2, 1, 1 and 2 respectively, resulting in a total of 6 bits. If n=2, the required bits for the deltas will be 2, 2, 2 and 2 respectively, resulting in a total of 8 bits. If n is larger, the total bits will be even more. Consequently, the encoder will choose n=1. Thus, diff_bits_minus1 will have a value of (n−1)=0.
  e. DiffBoundary, which is defined as $2^n-1$, is equal to 1. Syntax elements diff_minus_min (i.e., the delta between a current difference and the minimum difference) and diff_minus_min_rem (i.e., the excess part of the delta) are coded as:
    diff_minus_min[0]=1, diff_minus_min_rem[0]=0;
    diff_minus_min[1]=0, diff_minus_min_rem[1] not coded;
    diff_minus_min[2]=0, diff_minus_min_rem[2] not coded;
    diff_minus_min[3]=1, diff_minus_min_rem[3]=0;

At the decoder side, the decoding process is as follows:
  a. DLTValue[0]=60 since min_dlt_value=60. Maximum value in DLT is 60+14=74;
  b. Diff[0]=2+1+0=3, so DLTValue[1]=60+3+1=64;
  c. Diff[1]=2+0=2, so DLTValue[2]=64+2+1=67;
  d. Diff[2]=2+0=3, so DLTValue[3]=67+2+1=70;
  e. Diff[3]=2+1+0=3, so DLTValue[5]=70+3+1=74; 74 is equal to the maximum value in DLT, so stop parsing differences.

Exemplary syntax incorporating deltas of differences based on an embodiment of the present invention is shown in Table 5. Flag DLTDeduced is used to indicate whether the DLT can be deduced from diff_max_dlt_value and min_dlt_value. If diff_max_dlt_value is 0, there will be only one value in the DLT (i.e., min_dlt_value) and the flag DLTDeduced is set to 1. Furthermore, if diff_max_dlt_value is 1, there will be only two values in the DLT (i.e., min_dlt_value and min_dlt_value+1), DLTDeduced is also set to 1. In all other cases, DLTDeduced is set to 0.

TABLE 5

| | |
|---|---|
| diff_max_dlt_value | u(v) |
| min_dlt_value | u(v) |
| if(!DLTDeduced){ | |
|   min_diff | u(3) |
|   diff_bits_minus1 | u(3) |
|   for(j =0; DLTValue[j]<MaxDLTValue; j++){ | |
|     diff_minus_min[j] | u(v) |
|     if(diff_minus_min[j]==DiffBoundary) | |
|       diff_minus_min_rem[j] | ue(v) |
|   } | |
| } | |

In one embodiment, a flag is coded to signal whether the differential run-length coding is used for coding bit map values of the DLT. For example, the encoder and the decoder apply the bit map coding method to code the bit map values of the DLT as a bit-map directly when the flag is 0, and apply the differential run-length coding method to code the bit map values of the DLT when the flag is 1. The bit map values indicate whether the depth values are in the DLT respectively.

Figure 6:
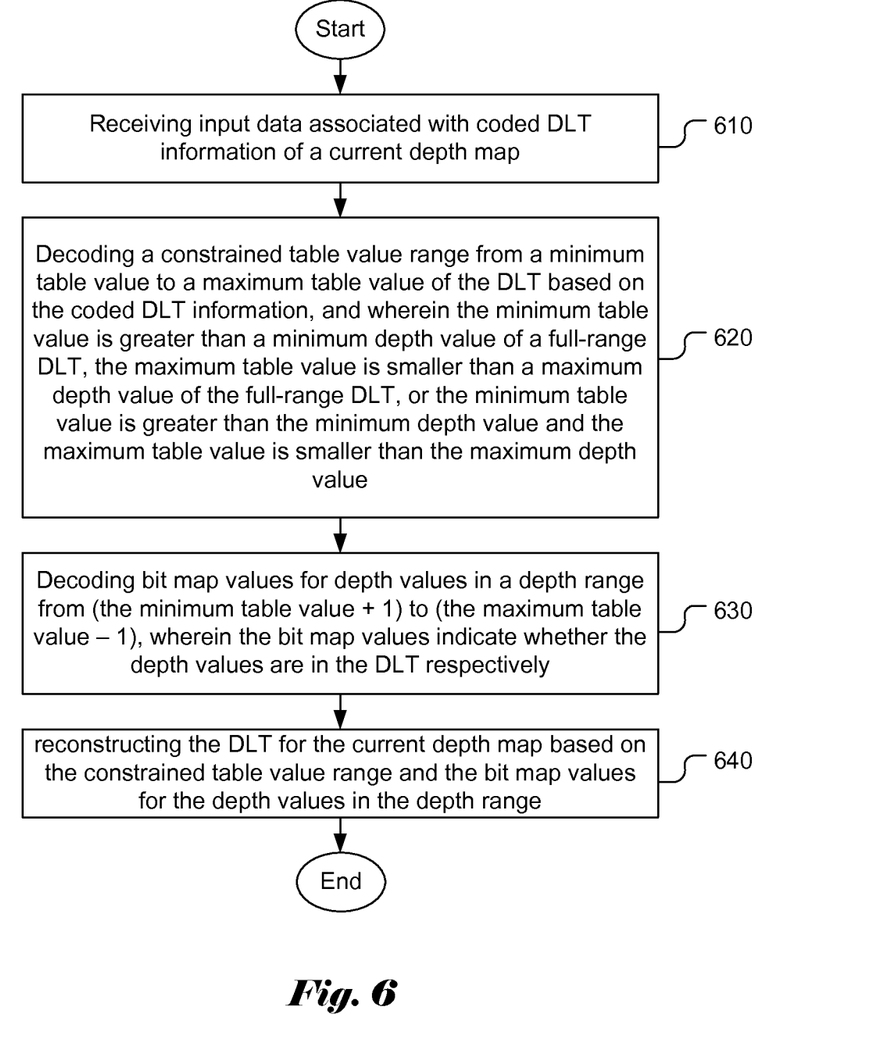
FIG. 6 illustrates an exemplary flow chart for decoding a depth lookup table according to an embodiment of the present invention.

FIG. 6 illustrates an exemplary flowchart for depth lookup table (DLT) decoding in a three-dimensional or multi-view video coding system incorporating a constrained table value range according to an embodiment of the present invention. The system receives input data associated with coded DLT information of a current depth map as shown in step 610. The input data may also be received from a processor such as a controller, a central processing unit, a digital signal processor or electronic circuits that produce the input data. A constrained table value range from a minimum table value to a maximum table value of the DLT is decoded based on the coded DLT information as shown in step 620. The minimum table value is greater than a minimum depth value of a full-range DLT, the maximum table value is smaller than a maximum depth value of the full-range DLT, or the minimum table value is greater than the minimum depth value and the maximum table value is smaller than the maximum depth value. Bit map values for depth values in a depth range from (the minimum table value+1) to (the maximum table value−1) are then decoded as shown in step 630, where the bit map values indicate whether the depth values are in the DLT respectively. The DLT for the current depth map is then reconstructed based on the constrained table value range and the bit map values for the depth values in the depth range.

Figure 7:
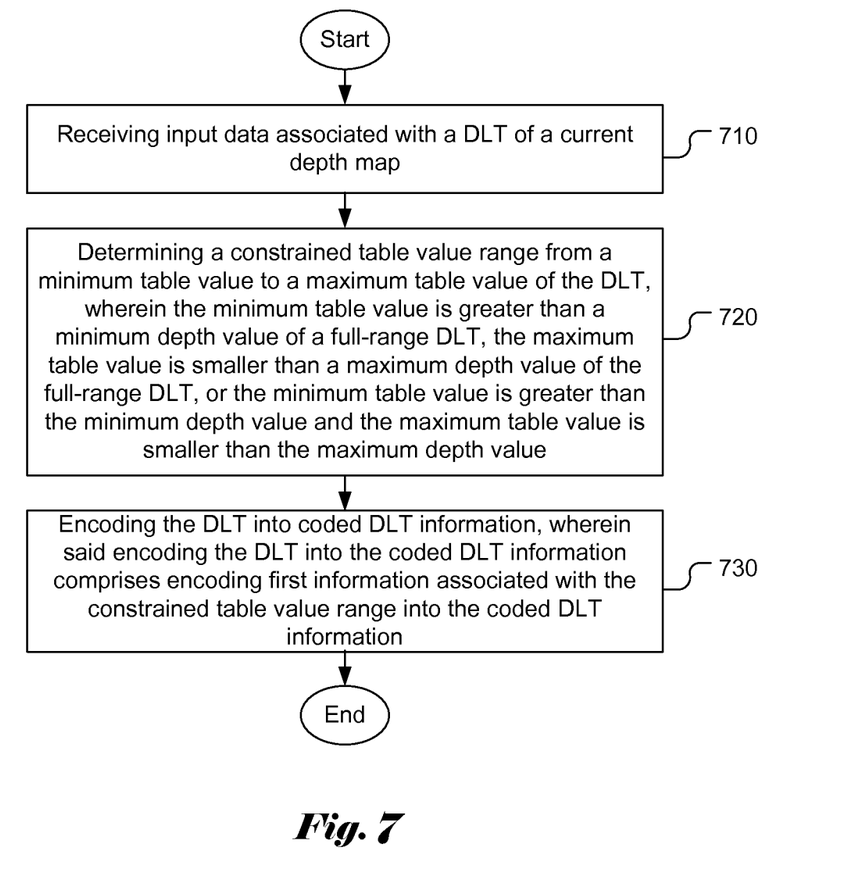
FIG. 7 illustrates an exemplary flow chart for encoding a depth lookup table according to an embodiment of the present invention.

FIG. 7 illustrates an exemplary flowchart for depth lookup table (DLT) encoding in a three-dimensional or multi-view video coding system incorporating a constrained table range according to an embodiment of the present invention. The system receives input data associated with the DLT of a current depth map as shown in step 710. The input data may also be received from a processor such as a controller, a central processing unit, a digital signal processor or electronic circuits that produce the input data. A constrained table value range from a minimum table value to a maximum table value of the DLT is determined as shown in step 720. The minimum table value is greater than a minimum depth value of a full-range DLT, the maximum table value is smaller than a maximum depth value of the full-range DLT, or the minimum table value is greater than the minimum depth value and the maximum table value is smaller than the maximum depth value. The DLT is then encoded into coded DLT information as shown in step 730, wherein said encoding the DLT into the coded DLT information comprises encoding first information associated with the constrained table value range into the coded DLT information.

The flowcharts shown above are intended to illustrate examples of depth lookup table with a constrained table range. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding a DLT (depth lookup table) in a three-dimensional or multi-view video coding system, the method comprising:
receiving input data associated with coded DLT information of a current depth map;
decoding a constrained table value range for the DLT from a minimum table value of the DLT to a maximum table value of the DLT based on the coded DLT information, and wherein the minimum table value is greater than a minimum depth value of a full-range DLT, the maximum table value is smaller than a maximum depth value of the full-range DLT, or the minimum table value is greater than the minimum depth value and the maximum table value is smaller than the maximum depth value, wherein values outside the constrained table value range are not used in the DLT;
decoding bit map values for depth values in a depth range from (the minimum table value+1) to (the maximum table value−1), wherein the bit map values indicate whether the depth values are in the DLT respectively; and
reconstructing the DLT for the current depth map based on the constrained table value range and the bit map values for the depth values in the depth range.

2. The method of claim 1, further comprising decoding a first flag to indicate whether to use the full-range DLT or a constrained DLT, wherein the constrained DLT has the constrained table value range from the minimum table value to the maximum table value.

3. The method of claim 1, wherein the constrained table value range is indicated by the minimum table value and a maximum table difference in the coded DLT information, wherein the maximum table difference corresponds to a first difference between the maximum table value and the minimum table value, and wherein the minimum table value and the maximum table difference are coded using unsigned integers.

4. The method of claim 3, wherein the minimum table value and the maximum table value use default values when the minimum table value and the maximum table difference are not coded in the coded DLT information.

5. The method of claim 4, wherein the minimum table value uses a first default value corresponding to −1 and the maximum table value uses a second default value corresponding to MAX_DEPTH_VALUE+1, wherein MAX_DEPTH_VALUE corresponds to the maximum depth value.

6. The method of claim 1, wherein the constrained table value range is indicated by the minimum table value and the maximum table value coded in the coded DLT information, wherein the minimum table value and the maximum table value are coded using unsigned integers.

7. The method of claim 1, wherein the bit map values for the depth values in the depth range are coded using run-length coding on zero-runs or one-runs associated with the bit map values.

8. The method of claim 7, wherein second differences between the zero-runs and a minimum zero-run or between the one-runs and a minimum one-run are encoded.

9. The method of claim 8, further comprising decoding a parameter n from the coded DLT information, wherein the second differences are coded using n-bit fixed length coding and n is a positive integer.

10. The method of claim 9, decoding an excess part of a current second difference from the coded DLT information when said n-bit fixed length coding indicates that the current second difference exceeds a maximum n-bit value represented by n bits, wherein the excess part is coded using an Exp-Golomb code, and wherein the excess part corresponds to a third difference between the current second difference and the maximum n-bit value.

11. The method of claim 7, wherein a flag is signaled to indicate whether the DLT is encoded using the run-length coding or the DLT is encoded as a bit-map directly.

12. The method of claim 1, wherein the bit map values for the depth values in the depth range are coded using inter-view coding when the current depth map is in a dependent view, wherein inter-view bit map values are formed by applying Exclusive-OR operations between the depth values in the depth range and second bit map values associated with a second DLT of a second depth map in a base view.

13. A method for encoding a DLT (depth lookup table) in a three-dimensional or multi-view video coding system, the method comprising:
receiving input data associated with the DLT of a current depth map;
determining a constrained table value range for the DLT from a minimum table value of the DLT to a maximum table value of the DLT, wherein the minimum table value is greater than a minimum depth value of a full-range DLT, the maximum table value is smaller than a maximum depth value of the full-range DLT, or the minimum table value is greater than the minimum depth value and the maximum table value is smaller than the maximum depth value, wherein values outside the constrained table value range are not used in the DLT;
encoding the DLT into coded DLT information, wherein said encoding the DLT into the coded DLT information comprises encoding first information associated with the constrained table value range into the coded DLT information; and
encoding bit map values for depth values in a depth range from (the minimum table value+1) to (the maximum table value−1), wherein the bit map values indicate whether the depth values are in the DLT respectively.

14. The method of claim 13, further comprising encoding a first flag to indicate whether to use the full-range DLT or a constrained DLT, wherein the constrained DLT has the constrained table value range from the minimum table value to the maximum table value.

15. The method of claim 13, wherein said first information associated with the constrained table value range consists of the minimum table value and a maximum table difference, wherein the maximum table difference corresponds to a first difference between the maximum table value and the minimum table value, and wherein the minimum table value and the maximum table difference are coded using unsigned integers.

16. The method of claim 15, wherein the minimum table value and the maximum table value use default values when the minimum table value and the maximum table difference are not coded.

17. The method of claim 16, wherein the minimum table value uses a first default value corresponding to −1 and the maximum table value uses a second default value corresponding to MAX_DEPTH_VALUE+1, wherein MAX_DEPTH_VALUE corresponds to the maximum depth value.

18. The method of claim 13, wherein said first information associated with the constrained table value range consists of the minimum table value and the maximum table value, wherein the minimum table value and the maximum table value are coded using unsigned integers.

19. The method of claim 13, wherein the bit map values for the depth values in the depth range are coded using run-length coding on zero-runs or one-runs associated with the bit map values.

20. The method of claim 19, wherein second differences between the zero-runs and a minimum zero-run or between the one-runs and a minimum one-run are encoded.

21. The method of claim 20, further comprising encoding a flag to indicate whether the DLT is encoded using the run-length coding or the DLT is encoded as a bit-map directly.

22. The method of claim 20, wherein the second differences are encoded into the coded DLT information using n-bit fixed length coding, wherein n is a positive integer.

23. The method of claim 22, wherein an excess part of a current second difference is coded using an Exp-Golomb code when the current second difference exceeds a maximum n-bit value represented by n bits, wherein the excess part corresponds to a third difference between the current second difference and the maximum n-bit value.

24. The method of claim 22, wherein an optimal value for n is determined based on a lowest resulting bitrate for the coded DLT information.

25. The method of claim 13, wherein the bit map values for the depth values in the depth range are coded using inter-view coding when the current depth map is in a dependent view, wherein inter-view bit map values are formed by applying Exclusive-OR operations between the depth values in the depth range and second bit map values associated with a second DLT of a second depth map in a base view.

26. An apparatus for decoding a DLT (depth lookup table) in a three-dimensional or multi-view video coding system, the apparatus comprising one or more electronic circuits, wherein said one or more electronic circuits are configured to:
receive input data associated with coded DLT information of a current depth map;
decode a constrained table value range for the DLT from a minimum table value of the DLT to a maximum table value of the DLT based on the coded DLT information, and wherein the minimum table value is greater than a minimum depth value of a full-range DLT, the maximum table value is smaller than a maximum depth value of the full-range DLT, or the minimum table value is greater than the minimum depth value and the maximum table value is smaller than the maximum depth value, wherein values outside the constrained table value range are not used in the DLT;
decode bit map values for depth values in a depth range from (the minimum table value+1) to (the maximum table value−1), wherein the bit map values indicate whether said depth value are in the DLT respectively; and reconstruct the DLT for the current depth map based on the constrained table value range and the bit map values for the depth values in the depth range.

27. An apparatus for encoding a DLT (depth lookup table) in a three-dimensional or multi-view video coding system, the apparatus comprising one or more electronic circuits, wherein said one or more electronic circuits are configured to:

receive input data associated with the DLT of a current depth map;

determine a constrained table value range for the DLT from a minimum table value of the DLT to a maximum table value of the DLT, wherein the minimum table value is greater than a minimum depth value of a full-range DLT, the maximum table value is smaller than a maximum depth value of the full-range DLT, or the minimum table value is greater than the minimum depth value and the maximum table value is smaller than the maximum depth value, wherein values outside the constrained table value range are not used in the DLT;

encode the DLT into coded DLT information, wherein said encoding the DLT into the coded DLT information comprises encoding first information associated with the constrained table value range into the coded DLT information; and encoding bit map values for depth values in a depth range from (the minimum table value+1) to (the maximum table value−1), wherein the bit map values indicate whether the depth values are in the DLT respectively.

* * * * *